United States Patent [19]

Maier et al.

[11] 4,141,319
[45] Feb. 27, 1979

[54] RUBBER TEAT HOLDER FOR MILKING CUPS

[75] Inventors: Jakob Maier, Türkheim, Allgäu, Fed. Rep. of Germany; Tilman Hoefelmayr, Zürich, Switzerland

[73] Assignee: Kuenzler & Co., Berneck, Switzerland

[21] Appl. No.: 680,671

[22] Filed: Apr. 27, 1976

[30] Foreign Application Priority Data

Apr. 28, 1975 [DE] Fed. Rep. of Germany ........ 2518897

[51] Int. Cl.² ............................................. A01J 5/04
[52] U.S. Cl. ............................ 119/14.47; 119/14.49; 119/14.53
[58] Field of Search ............... 119/14.47, 14.49, 14.53, 119/14.52, 14.48, 14.5, 14.51

[56] References Cited

U.S. PATENT DOCUMENTS

| 2,079,435 | 5/1937 | Dinesen | 119/14.49 |
| 2,744,496 | 5/1956 | Röben | 119/14.53 |
| 3,474,760 | 10/1969 | Siddall et al. | 119/14.49 |
| 3,696,790 | 10/1972 | Albright | 119/14.47 |
| 3,771,494 | 11/1973 | Mills | 119/14.47 |

FOREIGN PATENT DOCUMENTS

| 296131 | 5/1966 | Australia | 119/14.49 |
| 535132 | 1/1957 | Canada | 119/14.49 |
| 698339 | 11/1964 | Canada | 119/14.49 |
| 1238710 | 4/1967 | Fed. Rep. of Germany | 119/14.47 |
| 367297 | 2/1932 | United Kingdom | 119/14.53 |
| 686447 | 1/1953 | United Kingdom | 119/14.49 |
| 1400014 | 7/1975 | United Kingdom | 119/14.49 |
| 242576 | 4/1969 | U.S.S.R. | 119/14.47 |
| 387677 | 8/1973 | U.S.S.R. | 119/14.47 |

*Primary Examiner*—Clyde I. Coughenour
*Attorney, Agent, or Firm*—Blanchard, Flynn, Thiel, Boutell & Tanis

[57] ABSTRACT

A rubber teat holder for milking cups having a suction sleeve section which conically enlarges adjacent its upper edge and transforms into an enlarged holding edge for gripping over the milking cup housing. A ring lip extends radially inwardly from the holding edge toward the longitudinal axis of the suction sleeve, the inside diameter of the ring lip being smaller than the inside diameter of the conically tapering part of the suction sleeve. An annular gap is provided between the ring lip and the upper end of the suction sleeve and the annular gap is dimensioned so that the part of the ring lip which extends between the holding edge and the mouth of the suction sleeve forms a lever arm which can be loaded by alternating pressure differences between atmospheric pressure and suction pressure to render the lever arm pivotal with respect to the holding edge.

13 Claims, 5 Drawing Figures

RUBBER TEAT HOLDER FOR MILKING CUPS

FIELD OF THE INVENTION

The invention relates to a rubber teat holder for a milking cup comprising a suction sleeve which extends slightly conical at least in the part which is provided for receiving the teat and has a ring lip which projects from a holding edge which grips over a milking cup housing toward the longitudinal axis of the suction sleeve, the upper enlarging end of the suction sleeve transforming into the ring lip at a distance from the holding edge.

BACKGROUND OF THE INVENTION

Such a rubber teat holder is already known from German Offenlegungsschrift No. 2 007 613, in which the ring lip projects radially inwardly toward the longitudinal axis of the suction sleeve, however, in a direction which is away from the upper end of the suction sleeve. The holding edge is constructed as a cuff, which can be placed over the edge of the opening of a milking cup housing. In the case of such a milking cup there resulted always difficulties in holding the rubber teat holder on the milking cup housing. For this purpose, the upper edge of the milking cup housing had openings therein, in order to use the vacuum which exists during the suction cycle between the rubber teat holder and the milking cup housing to hold the cuff on the milking cup housing. However, such a mounting has not proven advantageous because also during the unloading or massaging act actions of force occurred between the rubber teat holder and the milking cup housing which led to a shifting of these parts against one another and alter the operation of the milking cup as a whole. Also it has been found that this known type of milking cup does not meet the rough requirements existing on a form because relatively much damage of the rubber teat holder occurred during the impact of the milking cup. Finally, as a whole, it was shown that this conventional milking cup demonstrated a repeated falling off from the teat during the unloading cycle.

Swiss Pat. Nos. 429 283 and 454 523 also already described rubber teat holders for milking cups in which the suction sleeve at its upper end ends in a high collar which encloses an enlarging space, and which leaves free an opening for introduction of the teat. An annular flange is cast on in the enlarging part of the suction sleeve, which annular flange forms an annular groove between itself and the outside of the suction sleeve, into which annular groove the upper edge of a milking cup housing can be received. Such a rubber teat holder has the important disadvantage that the upper enlarging space which is enclosed by the high collar is under a vacuum during the milking operation. Through this the part of the teat which lies in this area is stressed such that the teat enlarges beadlike, which can result in permanent damage to the teat. However, in the case of this known rubber teat holder the creation of a vacuum in this upper space is especially necessary in order to permit the milking cup at all to hold onto the teat during the entire milking operation.

Swiss Pat. No. 477 812 already discloses a rubber teat holder in which a suction sleeve is provided which usually does not grip around the teat. The suction sleeve transfers then at its upper end into a beadlike high collar which consists of a more solid material whereby the ring lip which encloses the opening for introduction of the teat is constructed as a lip which is turned inwardly against the suction sleeve, and which lip has on its inside an annular rib. Also in the case of this rubber teat holder the entire upper head portion is under a vacuum during the entire milking operation. Also during the entire milking operation, the turned-in ring lip rests through its rib on the teat and exerts a considerable pressure especially near the root of the teat which is particularly sensitive. This continuous pressure is supposed to imitate the closing movement of the mouth of a calf, however, effects in reality an extensive cutting-off of the milk flow in the teat.

The basic purpose of the present invention is now to produce a rubber teat holder, which permits a good holding of the milk cup without affecting the teat and the milk flow.

This purpose is attained inventively in the case of a rubber teat holder of the above-mentioned type by the ring lip being constructed sloped inwardly toward the suction stub or at a maximum lying in a plane which extends perpendicularly with respect to the longitudinal axis of the suction sleeve and that the inside diameter of the ring lip is less than the inside diameter of the slightly conical part of the suction sleeve, an imaginary extension of the conical taper of the part intersecting the inner edge of the ring lip.

Through this, the advantage is achieved that the ring lip is turned inside against the suction sleeve during introduction of the teat and snugly engages the teat when same is inserted so deep into the suction sleeve that same also snugly fits around the teat. Thus the ring lip forms a kind of a barb which holds the milking cup in its position on the teat during the unloading or massaging cycle because the collapsing or compressing of the suction sleeve causes the teat to be pressed upwardly out of the suction stub. Thus an underpressure which constantly acts onto the teat is not needed in order to hold the milking cup onto the teat. However, at the same time a lever arm is formed through the construction of the ring lip and the suction sleeve which engages at a spaced location from the base of the ring lip said ring lip, practically between the base of the ring lip and the point of engagement of the suction sleeve, against which lever arm the ring lip is pulled by the elastic suction sleeve in the suction cycle in direction of the tapering end of the suction stub. The opening of the ring lip widens so that it does not exert any pressure onto the teat during the suction cycle. Thus the milk flow in the teat is unhindered in the suction cycle.

During the change from the suction cycle to the unloading cycle, when the longitudinal pull or pressure exerted onto the suction sleeve becomes less, the ring lip is placed again against the teat and thus prevents a pressing out of the teat and a falling off of the milking cup from the teat. Since now for holding the milking cup on the teat a vacuum is no longer needed on the upper end of the rubber teat holder, the rubber teat holder can be constructed as a suction sleeve which from the start snugly encloses the teat. Thus the inner wall of the suction sleeve totally supports the part of the teat which extends into said suction sleeve and the vacuum which is applied on the suction sleeve becomes effective periodically practically only on the teat end. From this results an important protection of the entire teat.

To achieve this advantage, the arrangement may also naturally be such that the upper and greater enlarging end of the suction sleeve transfers directly into the holding edge, and that spaced from said transition there is constructed on the suction sleeve a ring lip which projects from said suction sleeve radially inwardly. Such a construction is to be considered as entirely equivalent.

The holding edge is advantageously constructed in form of a bead. This assures a fixed seat and a fixed mounting of the rubber teat holder on the milking cup housing provided for this purpose, without that effecting through this the mode of operation of the rubber teat holder. At the same time it is possible to produce the rubber teat holder in one piece and no special precautionary measures need to be taken for a fixed seat.

It has been proven as being advantageous to construct the bead in such a manner that a part of the bead lies protective above the free edge of the milking cup housing. From this results the effect that when the milking cup strikes the upper edge of the milking cup housing the part of the bead which lies above the edge resiliently absorbs the impact so that the ring lip which starts out from the bead is not struck. This assures a substantially higher operating protection.

The rubber teat holder is advantageously constructed such that the ring lip transfers into the holding edge at a point which is offset radially outwardly with reference to the longitudinal axis of the suction sleeve with respect to the inner edge of the milking cup housing which is to be gripped over by the holding edge. Through this it is possible to keep the distance between the outside of the suction stub and the inner wall of the milking cup housing particularly small so that the pump output, with which the milking cup must be operated, can also be held low.

Furthermore the milking cup remains handy in spite of the inventive advantages due to its small circumference. Furthermore it has proven to be advantageous in reality, to construct the holding edge such that it extends from the point of its transition into the ring lip on its inner side facing the suction stub in a surface which is sloped toward the tapering end of the suction stub. Such a construction serves the general thought to provide between the inside of the ring lip and the holding edge or the inside wall of a milking cup housing connected to the holding edge a free space which permits during the introduction of a teat into the suction stub the inward bending and/or a widening of the opening of the ring lip.

In order to achieve during the suction cycle an enlargement of the opening of the ring lip which is as extensive as possible, additional, radially extending ribs are provided on the ring lip. Several of such ribs may be provided, which are arranged advantageously regularly over the periphery of the ring lip. As particularly advantageous was found an arrangement, in which the reinforcing ribs are arranged each in pairs diametrically opposite one another. Furthermore it has been found to be advantageous in reality to develop the reinforcing ribs with a cross section which changes in its longitudinal direction such that the reinforcing ribs have a maximum reinforcement at the level of the point at which the stronger enlarging end of the suction stub transfers into the ring lip.

In particular the ring lip but also the slightly conically extending part of the suction sleeve are made preferably of a soft, elastic molding material. As such a molding material, for example a silicone rubber, has proven to be very good.

BRIEF DESCRIPTION OF THE DRAWINGS

The invention is supposed to be discussed more in detail in connection with one preferable exemplary embodiment which is illustrated in the drawings, in which.

DETAILED DESCRIPTION

Figure 1:
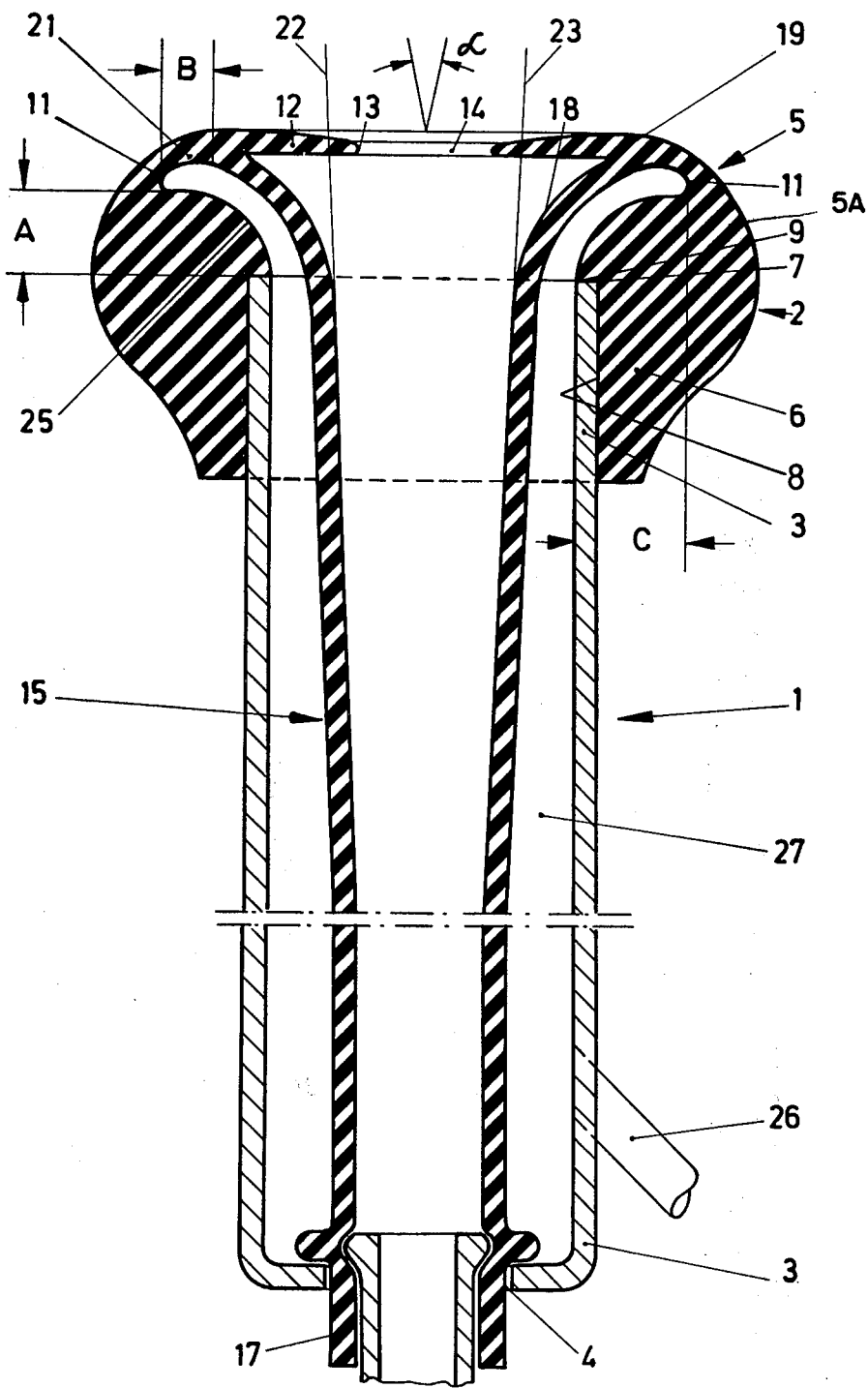
FIG. 1 is a longitudinal cross-sectional view of a simplified milking cup having a rubber teat holder constructed according to the invention.

A milking cup, which is identified in general with the reference numeral 1, is schematically illustrated in FIG. 1. The milking cup consists of a rubber teat holder 2 and an approximately cup-shaped milking cup housing 3 which has an opening 4 through its lower closed end. The rubber teat holder 2 has an enlarged head end 5 with an annular bead-shaped holding edge 6 and has a relatively large mass. The holding edge has on its outside an approximately streamlined profile having its largest radial thickness approximately below the level of the upper open top edge 7 of the milking cup housing 3. However, the upper extremity portion 5A projects above the upper extremity 7 of the milking cup housing 3. For placing the bead-shaped holding edge 6 onto the milking cup housing 3, a cylindrical recess 8 is provided on the inside of the holding edge, the inside diameter of which corresponds with the outside diameter of the milking cup housing 3. However, preferably the recess 8 is constructed such that it, when the rubber teat holder 2 is not as yet placed onto the milking cup housing 3, is conically tapered toward the end not facing the head end 5. This construction increases the strength of the holding force holding the rubber teat holder 2 on the milking cup 3. The milking cup housing 3 can be moved into the recess 8 until the edge 7 engages an annular lip 9 on the inside of the holding edge 6. The bead of the holding edge 6 projects a distance A in axial direction beyond or above the upper edge 7 of the milking cup housing 3. This part of the bead elastically receives during the impact of the edge of the milking cup housing 3 all impacts so that damages and in particular damage to the relatively thin parts of the rubber teat holder are avoided.

The bead-shaped holding edge 6 transfers at the point 11 into a substantially thinner ring lip 12 which extends substantially radially in a plane perpendicular to the longitudinal axis of the milking cup housing 3 and a suction sleeve member which will be discussed more in detail below. The inner edge 13 of the ring lip 12 encloses an opening 14 through which a teat can be introduced.

The rubber teat holder has a suction sleeve 15 which is constructed slightly conical at least on a part which lies close to the head end 5. The cone angle $\alpha$ is schematically indicated above the opening 14. The lower end 17 of the suction sleeve 15 remote from the head end 5 extends through the opening 4 in the milking cup housing 3 and is connected to a vacuum piping. The upper end of the suction sleeve 15 is enlarged more adjacent the head end than at the remaining slightly conical part. This enlarged end 18 of the suction sleeve 5 is then transferred at the point 19 into the ring lip 12. This transition point 19 is radially inwardly spaced at a distance B from the base 11 of the ring lip 12. The part of the ring lip 12 which extends between the base 11 and the transition point 19 of the suction sleeve forms a lever arm 21 which will be discussed below.

The lines 22 and 23 form imaginary extension lines of the slightly conically extending part of the suction sleeve. As can be seen from FIG. 1, in which the relationships of the dimensions are exaggerated for a better understanding, the inside diameter of the inner edge 13 of the ring lip 12 is smaller than the diameter of the slightly conical cone (illustrated by the lines 22 and 23) at the level of the inner edge 13 of the ring lip 12.

As can still further be seen from FIG. 1, the base 11 of the ring lip 12 is shifted radially outwardly a distance C relative to the inside wall of the milking cup housing 3. Through this it is possible to maintain the inside diameter of the milking cup housing 3 small by simultaneously utilizing the inventive advantages which will be discussed still later on.

The inside of the ring lip 12 extends in the nonuse condition of the rubber teat holder at a certain distance from the more enlarged section 18 of the suction sleeve 15. Through this arrangement, and because the inner edge of the ring lip 12 is constructed particularly flexibly, it is achieved that the part of the ring lip that extends in FIG. 1 in a substantially horizontal plane can be turned inwardly and downwardly so that an enlargement of the opening 14 occurs.

The part which forms the projection 9 of the bead-shaped holding edge 6 has a surface 25 which extends inclined from the base 11 of the ring lip inwardly and downwardly toward the milking cup housing 3. This inclined and, if necessary, constantly curved surface 25 extends at a distance from the lever arm part 21 of the ring lip and the more enlarged end 18 of the suction sleeve. This construction is particularly advantageous for the actual milking operation which will be discussed in more detail in connection with FIGS. 2 and 3.

The milking cup housing 3 has an inlet stub member 26 thereon through which a vacuum can be produced periodically by a pulsator in the chamber 27 between the outside of the suction sleeve 15 and the inner side of the milking cup housing 3.

Figure 2:
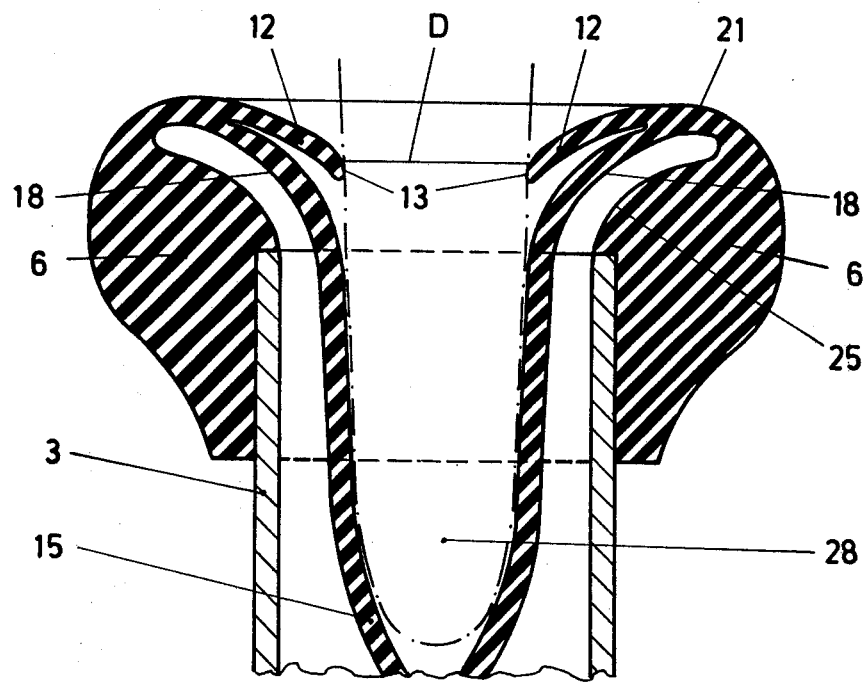
FIG. 2 is a partial cross-sectional view of the head of the rubber teat holder with a teat therein in the unloading cycle.
Figure 3:
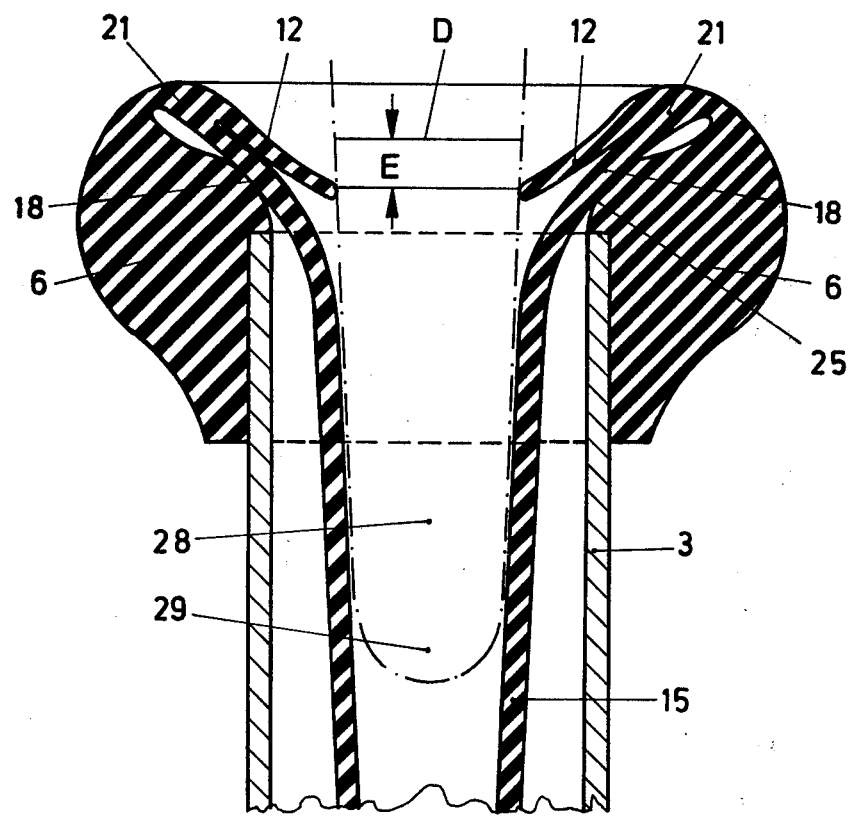
FIG. 3 is a partial cross-sectional view of the head of a rubber teat holder, which view corresponds to FIG. 2, comprising a teat therein in the sucking cycle.

The operation of the inventive rubber teat holder is discussed in more detail hereinafter in connection with FIGS. 2 and 3. If a teat 28 is introduced into the rubber teat holder shown in FIG. 2 through the opening 14 until the teat is surrounded generally by the slightly conically extending part of the suction sleeve 15, then the ring lip 12 is pressed due to its smaller inside diameter compared with the cone of the suction sleeve from its horizontal position in FIG. 1 downwardly and inwardly in direction of the milking cup housing 3. Its inner edge 13 snugly engages the teat 28 and encloses same. If the ring lip was already from the start slightly turned in, then it is still further pressed downwardly and inwardly by the introduction of the teat. The ring lip 12 forms in this position practically a kind of a barb to prevent a removal of the rubber teat holder or from the teat from the milking cup all together. If a vacuum is now applied to the lower end of the suction sleeve 15, the teat is correctly pulled into the suction sleeve 15 and is simultaneously supported through it practically over its entire length up to the inner edge 13 of the ring lip 12. The distance between the part of the suction sleeve which lifts off again from the teat in its enlarged part 18 and the inner edge 13 of the ring lip which engages the teat is very small. Through this practically the entire part of the teat, at which an underpressure can become active, with the exception of the tip of the teat 29, is supported. During the unloading cycle illustrated in FIG. 2, the suction sleeve 15 collapses because the continuously acting vacuum from the vacuum piping attacks inside of the suction sleeve while the space between the suction sleeve and the inside of the milking cup housing is under atmospheric pressure. During this unloading cycle, the suction sleeve 15 tries to press the teat 28 upwardly in FIG. 2 out of the suction sleeve. This, however, is prevented by the ring lip 12, which serves as a barb.

The space which lies between the outside of the suction sleeve and the inside of the milking cup housing 3 is then placed under a vacuum during the suction cycle. The enlarging part 18 of the suction sleeve engages the inner surface 25 of the bead-shaped holding edge 6 on one side under the vacuum which acts on its inside and on the other side the atmospheric pressure acting on the outside of the rubber teat holder. If one takes in FIG. 2 the reference line D in relationship to the upper edge of the rubber teat holder, then the teat 28 is during this suction cycle pulled together with the suction sleeve 15 into the milking cup housing 3 a distance E which is illustrated in FIG. 3. The end of the suction sleeve 15 engages, spaced at a distance of the lever arm 21, also the ring lip 12 and pulls same axially inwardly. The opening 14 which is enclosed by the inner edge 13 of the ring lip is hereby enlarged. This has the result that the teat is entirely unloaded so that an unprevented milk flow in the teat is assured. If then atmospheric pressure is again produced in the unloading cycle in the space between the suction sleeve 15 and the milking cup housing 3, the suction sleeve 15 and the ring lip 12 again assume the position illustrated in FIG. 2, whereby the teat 28 is moved again a distance E in relationship to the milking cup 3. The ring lip 12 acts as a barb in this position. Thus a kind of a milking movement is produced simultaneously.

Figure 4:
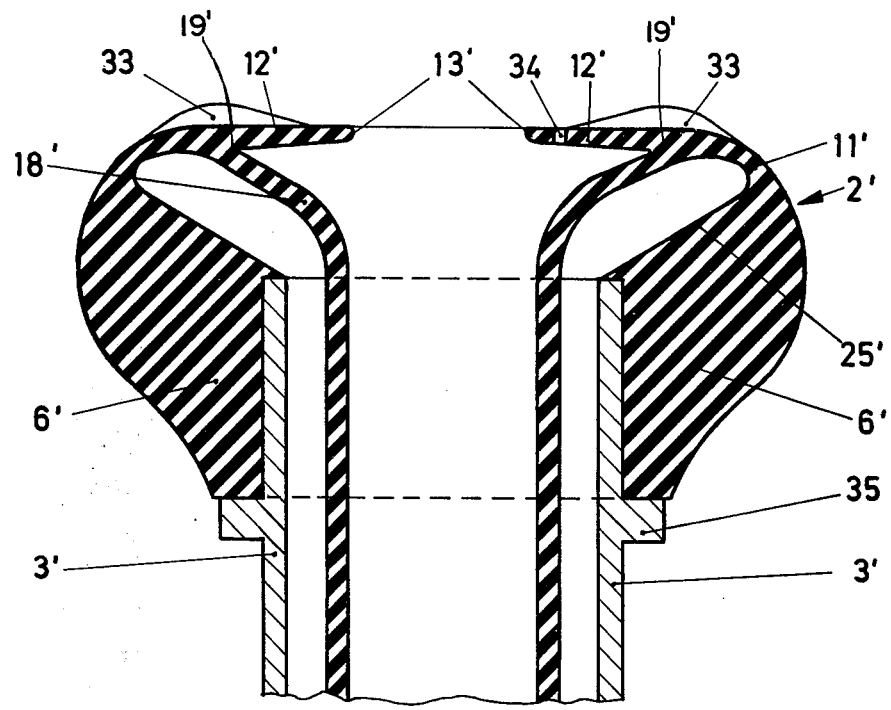
FIG. 4 is a longitudinal cross-sectional view of a further embodiment of a rubber teat holder which is constructed according to the invention.
Figure 5:
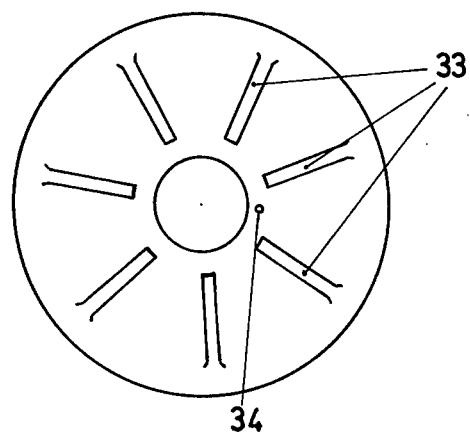
FIG. 5 is a top view of the head part of the rubber teat holder which is illustrated in FIG. 4.

FIG. 4 illustrates a further embodiment of a rubber teat holder which is constructed according to the invention. Such parts, which correspond to the parts illustrated in the preceding figures, are identified with the same reference numerals including the addition of the suffix of a prime. The additional differences which exist in comparison with the preceding embodiment will only be discussed below.

The embodiment which is illustrated in FIG. 4 shows the surface 25' which extends from the base 11' on the inside of the holding edge 6' inwardly as a purely conical surface. From this results a particularly large space between this inner surface 25' and the outside of the strongly enlarging end 18' of the suction sleeve 15. Through this it is achieved in a particularly reinforced degree that the transition point 19', at which the enlarging end of the suction sleeve 15 transfers into the ring lip 12', describes a larger circular arc around the base 11' of the ring lip if during the suction cycle the suction sleeve 15 is pulled downwardly in its longitudinal direction in FIG. 4. When the transition point 19' finally engages the surface 25', the diameter of the ring lip is increased at the point 19'. Thus forces which act radially outwardly are applied onto the ring lip, which forces also lead to an enlargement of the opening 14.

In this exemplary embodiment, additional ribs 33 are provided to support the radial tension which is applied onto the inner edge 13' of the opening 14. These ribs are arranged on the outside of the ring lip 12' and extend in a radial direction. Several of such ribs can be provided, preferably evenly distributed over the periphery of the ring lip. The ribs 33 are constructed in form of upright webs which have along their longitudinal expansion different cross sections. It has been proven advantageous to construct the maximum cross section of such a rib at the point at which the enlarging end of the suction sleeve joins the ring lip. This is achieved in the exemplary embodiment which is illustrated in FIG. 4 by making the rib have its maximum height at this point. Through this construction of the rib 33, it is achieved that the forces which effect a radial expansion of the lip 12' are also transmitted at an optimum to the inner edge 13' of the ring lip and effect there an optimum expansion of the opening 14. The ribs 33 can, of course, also be constructed on the underside of the ring lip 12', however, for reasons of an improved hygiene, a construction has been proven to be advantageous in which the ribs are mounted on the outside. However, improved effects can already be produced by ribs which have a continuously even cross section. At any rate, the ribs should terminate, however, at a certain radial distance in front of the edge of the opening 14, so that this edge is particularly elastic. In order to keep during the milking operation the space between the enlarging end 18' of the suction sleeve and the inside of the ring lip 12 as free as possible from an underpressure, it can be advantageous, to provide additional openings 34 in the ring lip 12 which connect this space to the outer atmosphere.

The milking cup housing 3' has in addition in FIG. 4 a collar 35 which prevents the bead-shaped holding edge 6' from shifting in the longitudinal direction of the milking cup housing when the milking cup falls down and lands on the head. Also in this case, the entire force from the landing is thus absorbed resiliently by the bead-shaped holding edge so that the rubber teat holder is not damaged.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a rubber teat holder for milking cups comprising a suction sleeve which is more conically enlarged at its upper end than at its lower end and having a holding edge thereon which is engaged with a milking cup housing to form a rigid member, said suction sleeve extending into said milking cup housing and being less in diameter than said milking cup housing to define a chamber therebetween, first means defining an annular gap between said upper end of said suction sleeve and said rigid member, a thin and elastic ring lip extending radially inwardly from said rigid member toward the longitudinal axis of said suction sleeve, the inner diameter of said ring lip being smaller than the inner diameter of the extended conical part of said suction sleeve at the height of the radially inner edge of said ring lip, the improvement comprising an upper extremity portion of said rigid member extending above the upper extremity of said milking cup housing, second means for effecting an enlargement of said inner diameter of said ring lip in response to suction pressure applied at least to said chamber, said second means including a positioning of a terminal end of said annular gap above said milking cup housing to define a base point between said ring lip and said upper extremity portion of said rigid member, said ring lip intermediate said base point and said inner diameter joining said upper end of of said suction sleeve to form a transition point, said annular gap extending generally horizontally between said base point and said transition point, said ring lip being pivotal at changing pressure differences between outside atmosphere and pressures within said annular gap about said base point and with respect to said rigid member due to the resulting lever action of the part of said ring lip between said base point and said transition point to effect said enlargement of said inner diameter.

2. The improved rubber teat holder according to claim 1, wherein said base point is spaced radially outwardly and above the inner edge of said milking cup housing.

3. The improved rubber teat holder according to claim 2, wherein said holding edge extends on its inner side facing said suction sleeve from said base point in a surface which is inclined radially inwardly and downwardly.

4. The improved rubber teat holder according to claim 1, wherein at least one radially extending reinforcing rib is provided on an axially facing surface of said ring lip.

5. The improved rubber teat holder according to claim 4, wherein several radially extending, circumferentially spaced reinforcing ribs are provided in diametrically spaced pairs around said surface of said ring lip.

6. The improved rubber teat holder according to claim 4, wherein said reinforcing rib extends from a location on said surface of said ring lip spaced radially outwardly from said inner diameter thereof to a location spaced radially outwardly of said transition point.

7. The improved rubber teat holder according to claim 4, wherein said reinforcing ribs have a cross section which changes along the radial length thereof.

8. The improved rubber teat holder according to claim 7, wherein said reinforcing ribs have a maximum solidity at the height of a point at which said upper end of said suction sleeve ends in said ring lip.

9. The improved rubber teat holder according to claim 1, wherein in said ring lip there is provided at least one opening which leads into the inside of said suction sleeve.

10. The improved rubber teat holder according to claim 1, wherein said ring lip consists of a soft elastic material.

11. The improved rubber teat holder according to claim 10, wherein the elastic material is a silicone rubber.

12. The improved rubber teat holder according to claim 1 wherein said ring lip extends radially inwardly and downwardly toward the central axis of said suction sleeve.

13. The improved rubber teat holder according to claim 1, wherein said ring lip between said inner diameter and said transition point extends downwardly slopingly relative to the longitudinal axis of said suction sleeve.

* * * * *